(12) United States Patent
Wotring

(10) Patent No.: US 8,997,201 B2
(45) Date of Patent: Mar. 31, 2015

(54) INTEGRITY MONITORING TO DETECT CHANGES AT NETWORK DEVICE FOR USE IN SECURE NETWORK ACCESS

(75) Inventor: Brian Wotring, Eagle River, AK (US)

(73) Assignee: Cisco Technology, Inc., San Jose, CA (US)

( * ) Notice: Subject to any disclaimer, the term of this patent is extended or adjusted under 35 U.S.C. 154(b) by 281 days.

(21) Appl. No.: 13/471,420

(22) Filed: May 14, 2012

(65) Prior Publication Data

US 2013/0305340 A1  Nov. 14, 2013

(51) Int. Cl.
*G06F 21/00* (2013.01)
*H04L 29/06* (2006.01)
*H04W 12/10* (2009.01)

(52) U.S. Cl.
CPC ............ *H04L 63/1416* (2013.01); *H04L 63/20* (2013.01); *H04W 12/10* (2013.01)
USPC ........ 726/12; 726/2; 726/10; 726/11; 726/22; 726/25; 713/153; 713/155; 713/168

(58) Field of Classification Search
USPC .......... 726/1–4, 22–25, 11–12; 713/153, 155, 713/168
See application file for complete search history.

(56) References Cited

U.S. PATENT DOCUMENTS

| | | | |
|---|---|---|---|
| 7,917,627 B1 | 3/2011 | Andriantsiferana et al. | |
| 7,966,489 B2 | 6/2011 | Cam-Winget et al. | |
| 8,024,488 B2 | 9/2011 | Salowey et al. | |
| 2006/0015724 A1* | 1/2006 | Naftali et al. | 713/168 |
| 2006/0084417 A1* | 4/2006 | Melpignano et al. | 455/418 |
| 2007/0124803 A1* | 5/2007 | Taraz | 726/4 |
| 2007/0234402 A1 | 10/2007 | Khosravi et al. | |
| 2009/0119741 A1* | 5/2009 | Palnitkar et al. | 726/1 |
| 2010/0050249 A1 | 2/2010 | Newman | |
| 2010/0293596 A1* | 11/2010 | Terry | 726/3 |
| 2012/0084836 A1* | 4/2012 | Mahaffey et al. | 726/3 |

FOREIGN PATENT DOCUMENTS

| | | |
|---|---|---|
| EP | 1055990 | 11/2000 |
| EP | 1056010 | 11/2000 |

* cited by examiner

*Primary Examiner* — Venkat Perungavoor
*Assistant Examiner* — Amir Mehrmanesh
(74) *Attorney, Agent, or Firm* — Cindy Kaplan

(57) ABSTRACT

In one embodiment, a method includes initiating integrity monitoring at a network device, continuously monitoring the network device to detect changes at the network device over a period of time, and transmitting information collected during said integrity monitoring to a security device for use in determining if the network device is allowed access to a trusted network. An apparatus and logic are also disclosed.

18 Claims, 3 Drawing Sheets

INTEGRITY MONITORING TO DETECT CHANGES AT NETWORK DEVICE FOR USE IN SECURE NETWORK ACCESS

TECHNICAL FIELD

The present disclosure relates generally to communication networks, and more particularly, to monitoring of network device to determine integrity of host environment

BACKGROUND

The security of today's networks has become increasingly important in the presence of growing technological complexity and'heightened threats that can disrupt business and cause downtime. One important place to enforce security is at a host (e.g., mobile device, server, client device, or other endpoint device). The threats associated with hosts, and in particular the growing number of mobile devices, open a whole new set of security concerns. A compromised host can present a risk to the network or other hosts in the network. Thus, it is important for a complete approach to network security to include visibility into the host environment.

BRIEF DESCRIPTION OF THE FIGS.

Corresponding reference characters indicate corresponding parts throughout the several views of the drawings.

DESCRIPTION OF EXAMPLE EMBODIMENTS

Overview

Figure 1:
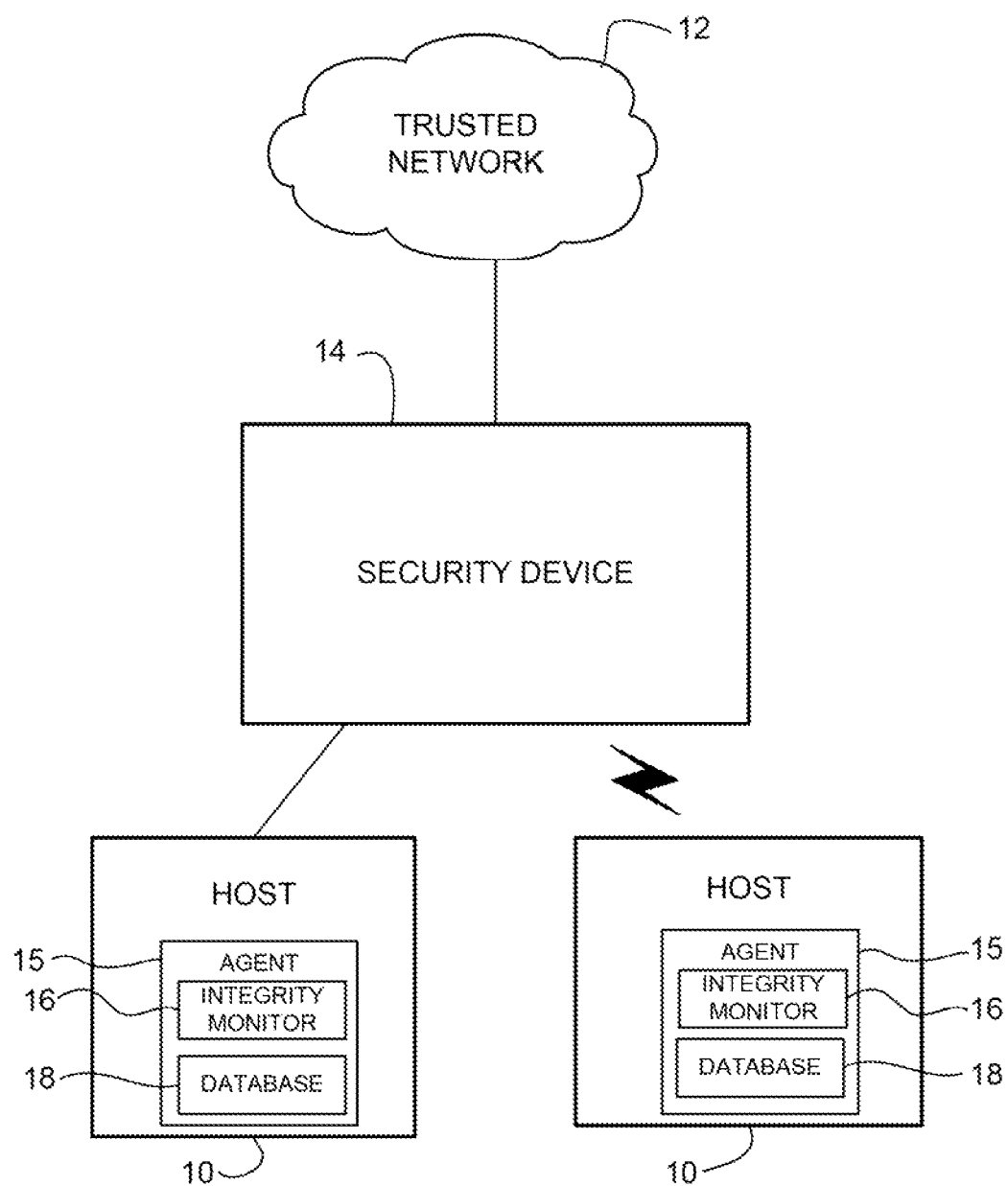
FIG. 1 illustrates an example of a network in which embodiments described herein may be implemented.

In one embodiment, a method generally comprises initiating integrity monitoring at a network device, continuously monitoring the network device to detect changes at the network device over a period of time, and transmitting information collected during integrity monitoring to a security device for use in determining if the network device is allowed access to a trusted network.

In another embodiment, an apparatus generally comprises a processor for initiating integrity monitoring at a network device, continuously monitoring the network device to detect changes at the network device over a period of time, transmitting information collected during integrity monitoring to a security device for use in determining if the network device is allowed access to a trusted network. The apparatus further comprises memory for storing the information collected during integrity monitoring.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The term 'posture assessment' is often used to describe the process of documenting the current state of an environment, and then comparing that state to a known good or baseline state. Posture assessment may be used to evaluate system security based on applications and settings that a particular system is currently using. Conventional posture assessment provides an operational test of security, creating a snapshot in time of the vulnerability state of a system. For example, a host may be subjected to inspection prior to being given network access and a posture assessment module may report on data collected from a host environment just prior to secure network access. Information obtained from the host is compared to network policy and a decision is made to allow, deny, or possibly quarantine the host. However, this information only provides a snapshot of items from the host environment considered to be of interest or relevant to network policy or security just prior to network access. While this is valuable in determining the current state of the host, it is limiting in that many changes leading up to the posture assessment process will go undetected, with many of them being relevant to network security or policies. Thus, many of the changes that occur at a host level leading up to the request for network access are noteworthy, yet can go undetected.

The timing of when data is collected presents a large gap in security for conventional posture assessment. Isolated snapshots provide limited visibility into the host environment, significance of changes, and threats to confidentiality, integrity, and the surrounding infrastructure. These snapshots are incapable of providing visibility into changes in the host landscape over time and exclude valuable information that could impact a compliance determination. While a host may be compliant just prior to network access, changes that occurred leading up to that time may be indicative of threats that would otherwise go undetected. There is, therefore, a need for collection of posture related data over a period of time leading up to network access, to be included in a posture assessment report.

The embodiments described herein provide for continuous monitoring of the host so that changes to targeted elements in the host environment leading up to a posture assessment report can be identified, rather than just the current state of the environment. The embodiments greatly expand the reach of policy logic when determining whether or not a host is considered compliant with network security or other policies. The dimension of time is added to posture assessment data and makes available data points from the host environment that are unavailable with conventional systems. Monitoring of the host to detect changes over time and incorporating this information into a posture assessment report, allows for greater visibility into host level policy violations and in depth security to be better established in a deployment. The embodiments also provide information for use in auditing, trend analysis, forensics, and incident response.

Referring now to the drawings, and first to FIG. 1, an example of a network in which embodiments described herein may be implemented is shown. The embodiments operate in the context of a data communication network including multiple network elements. For simplification, only a small number of network elements are shown. The example shown in FIG. 1 includes a plurality of network devices (e.g., hosts, endpoints, user nodes, client nodes, end stations) 10 in communication with a trusted network 12 through a security device 14. The trusted network 12 may be; for example, an internal network, corporate network, campus network or any other secure network, which includes protected resources. The hosts 10 may be connected to the network using wired media (e.g., IEEE 802.3/Ethernet) or wireless media (e.g., IEEE 802.11/WiFi).

The security device 14 is located within a data path between the hosts 10 and the trusted network 12. The security device 14 may be an appliance, headend device, or other network device configured to perform security functions, policy enforcement, or other functions required for secure access to the network 12. The security device 14 may be, for example, an Adaptive Security Appliance (ASA) available from Cisco Systems, Inc. of San Jose, Calif. The security device 14 may be a standalone device or may be located in a network device operating as a firewall, VPN (Virtual Private Network) appliance, or gateway, for example. The security device 14 may be located, for example, at a branch office or main office for communication with a plurality of hosts 10.

The security device 14 may store policies for device type, user role, device posture, location, security compliance, etc. The security device 14 may include, for example, an administration server and database that centralizes configuration and monitoring of the hosts 10, users, and policies or may be in communication with one or more network devices comprising a server or database. The security device 14 may receive data (e.g., policies, security information, etc.) from any number of devices within the network. The security device 14 may store status, device, and user information for each of the hosts 10. The host information may include, for example, authentication status (e.g., authenticated, unauthenticated, authentication failed, log-in time), authentication type, user/device information (e.g., user name, device name, device type, location, operating system) or any other information.

The security device 14 may also be in communication with an authentication server (e.g., one or more access directory, access control server, AAA (authentication, authorization and accounting) server/proxy, etc.), policy server, application server, controller, security manager, client profile manager, or any other node, combination of nodes, or source (e.g., network administrator) that provides authentication or policy information for the hosts 10.

The security device 14 receives requests from the hosts 10 to access the trusted network 12. The security device 14 may be configured, for example, to identify the host 10 and link the host to a specific user, as well as control the security posture of the host. The security device 14 may check the host 10 for compliance against security policies (e.g., corporate security standards) based on posture and integrity information received from the host, as described below. If the security device 14 determines that the host adheres to a certain security baseline and other policies associated with the network, the security device 14 will allow the host 10 to access the network 12.

The host 10 may be, for example, a desktop computer, laptop computer, IP phone, server, appliance, game console, printer, camera, sensor, mobile phone, tablet, personal digital assistant, or any other device configured for communication with the network 12. The host 10 may be a managed or unmanaged device. For example, a user may attempt to access the network 12 from a corporate-managed personal computer, personal network-accessible device, or public terminal. The host 10 may be a wired device or wireless device. The host 10 may also be configured for both wired communication (e.g., connected to a docking station) and wireless communication. Any number of network elements may be interposed between the security device 14 and the hosts 10. For example, the security device 14 may be in wired communication with an access point (not shown), which is in wireless communication with the endpoint 10.

As shown in FIG. 1, the host 10 comprises a security agent (e.g., posture agent, mobility client) 15. The agent 15 comprises a module (e.g., program, software, application, code) that resides on the host 10. The agent 15 preferably has full visibility on the host 10, which allows the agent to gather information for which no other security component in the network has visibility. The agent 15 generates integrity and posture information that is collected and correlated at the security device 14.

The agent 15 includes an integrity monitor 16 operable to continuously monitor the host 10 and a database 18 for storing data collected during integrity monitoring and posture assessment. As described in detail below, the integrity monitor 16 detects changes at the host 10 leading up to the posture assessment report, rather than just the current state of the environment. The integrity monitor 16 looks for suspect changes over a period of time and reports at access time or whenever a posture assessment report is transmitted to the security device 14. The changes may indicate possible security threats or policy noncompliance.

Information collected by the agent 15 may include posture information such as basic operating system type and version information or detailed information such as open network ports and installed security application (e.g., antivirus software, personal firewall software). Conventional posture assessment information may be stored in the database 18 and transmitted to the security device. 14 along with security information gathered by the integrity monitor 16.

It is to be understood that the term 'integrity monitoring' as used herein may refer to host integrity monitoring, security monitoring, policy monitoring, intrusion detection, posture assessment/tracking, or any other monitoring of the host or elements in the host environment. As described in detail below, the host is continuously monitored to detect changes at the host (e.g., changes to targeted elements in the host environment) that may indicate a security threat. Changes it the host may include, for example, changes to settings, users, groups, applications, addresses, signals, etc. The term 'continuously monitor' as used herein refers to monitoring for a period of time that provides more than a 'snapshot' of current host state. The monitoring may take place after the host 10 ends its connection with the network 12, before the host attempts to access the network, while the host is in communication with the:network, or any combination thereof. Continuous monitoring may include one or more temporary periods in which the host is not being monitored, as long as the host is monitored for a continuous period of time before requesting access to the network 12.

The host 10 may include antivirus software comprising a virus detector operable to detect a virus (e.g., virus, worm, spyware) or other damaging data at the host. The virus detector may be a Collection of routines or programs that execute pattern matching, looking for a specific or systematic traffic behavior. The host 10 may also include endpoint security technologies to prevent keyloggers, hacking, or other security threats. These or other security applications may be integrated into the agent 15.

It is to be understood that the network shown in FIG. 1 and described herein is only an example and that the embodiments may be implemented in networks, having different network topologies or network devices, without departing from the scope of the embodiments.

Figure 2:
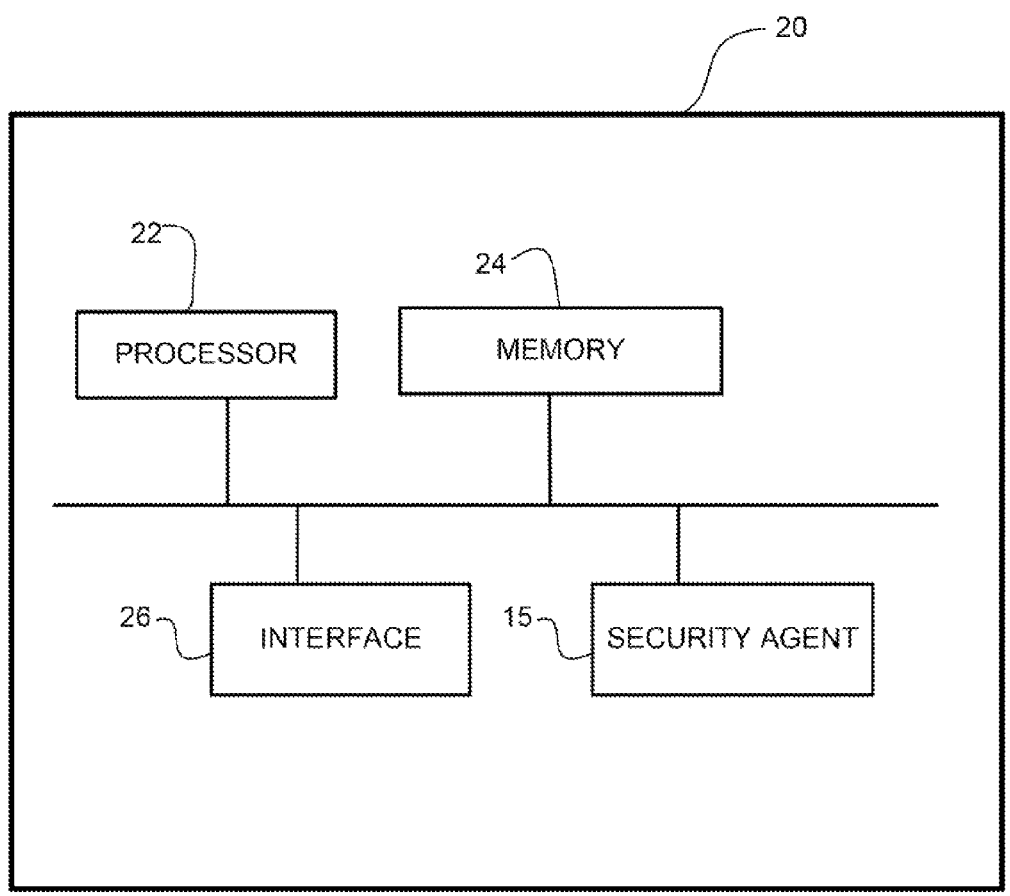
FIG. 2 depicts an example of a network device useful in implementing embodiments described herein.

FIG. 2 illustrates an example of a network device 20 (e.g., host) that may be used to implement the embodiments described herein. In one embodiment, the network device 20 is a programmable machine that may be implemented in hardware, software, or any combination thereof. The network device 20 includes one or more processor 22, memory 24, network interface 26, and security agent 15. The agent 15 may comprise software, application, code, or program stored in memory 24.

Memory 24 may be a volatile memory or non-volatile storage, which stores various applications, operating systems, modules, and data for execution and use by the processor 22. Memory 24 may store posture and integrity information collected during integrity monitoring, for example.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 26 may comprise any number of wireless or wired interfaces (linecards, ports) for receiving data or transmitting data to other devices. The network interface 26 may comprise, for example, a wired interface (e.g., Ethernet interface), a radio interface (e.g., 3G/4G radio interface) for communication via a base station, or a WiFi interface for communication with an access point.

The network device 20 may also include an antenna for wireless communication and RF (Radio Frequency) circuitry (not shown). The RF circuitry receives and transmits RF signals and converts electrical signals to or from electromagnetic signals and communicates with communication devices via the electromagnetic signals. Communication circuitry allows the device 20 to communicate with other network devices using any suitable communication protocol.

It is to be understood that the network device 20 shown in FIG. 2 and described above is only an example and that different configurations of network devices may be used. For example, the network device 20 may further include any suitable combination of hardware, software, algorithms, processors, devices, components, or elements operable to facilitate the capabilities described herein.

Figure 3:
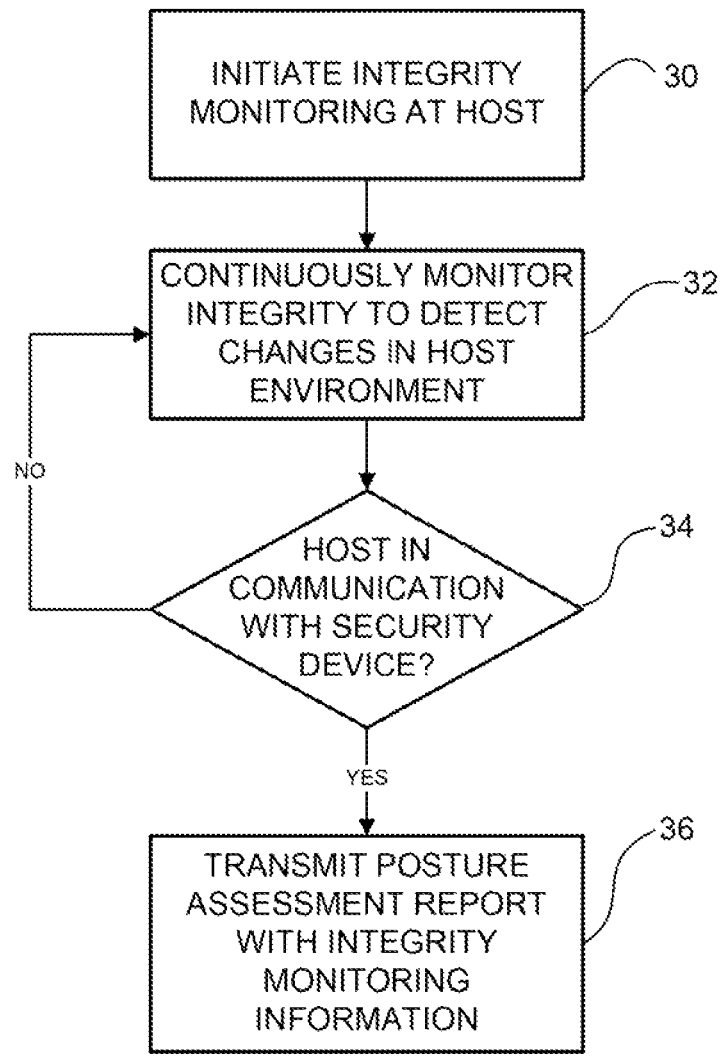
FIG. 3 is a flowchart illustrating an overview of a process for integrity monitoring at a network device for use in secure network access, in accordance with one embodiment.

FIG. 3 is a flowchart illustrating a process for monitoring integrity of a network device (e.g., host, endpoint 10) for use in detecting changes at the network device, in accordance with, one embodiment. As previously described, information gathered by the integrity monitor 16 is used by the security device 14 in determining whether or not the network device is permitted access to the trusted network 12. At step 30, integrity monitoring is initiated at the host 10. The integrity monitoring may be initiated, for example, when the security agent 15 is installed at the host 10. The agent 15 may be installed by downloading an application from a server or transmitted to the host 10 by the security device 14 and installed when the host attempts to gain access to the network 12 for the first time. The agent 15 continuously monitors the host 10 to detect changes at the host (step 32). The agent 15 may comprise a list Of elements in the host environment that are to be monitored by the integrity monitor 16.

The monitoring may occur before the host 10 has gained access to the network 12 or while the host is in communication with the network to ensure that the host does not pose a security threat to the network. The monitoring continues after the host 10 has disconnected from the network 12. Once the agent 15 is installed at the host 10, it can monitor the host prior to the host requesting network access, so that when the host attempts to contact the network 12, the information collected by the integrity monitor 16 can be used by the security device 14 in determining whether or not to allow the host access to the network. The agent 15 continues to monitor the host 10 after the host terminates its connection to the network 12 so that the next time that the host 10 attempts to gain access to the network, the security device 14 can use the information collected during integrity monitoring to determine if the host is compliant with network policies.

When the host 10 is in communication with the security device 14 (e.g., attempts to gain access to network 12 or already permitted access to the network), the agent 15 transmits a posture assessment report that contains the information collected by the integrity monitor 16 (steps 34 and 36). The report is transmitted to the security device 14 each time the host 10 attempts to access the network 12 and may also be transmitted periodically once the host is in communication with the network.

It is to be understood that the process shown in FIG. 3 and described above is only an example and that steps may be added, combined, or modified, without departing from the scope of the embodiments.

As described above, the integrity monitor 16 collects information that can be used to detect changes over time at the host 10. The integrity monitor 16 may detect, for example, attacks not identified by the antivirus software, signs of tampering, or explicit attempts at avoiding detection. Examples further include short-lived changes to:users/groups, loaded kernel modules, or security settings, short lifetimes of set user ID (SUID) processes, brief use of bound network ports, or antivirus or firewall products that are temporarily crippled in some way and then restored. Other information collected by the integrity monitor 16 may include, for example, identification of new software that was downloaded and installed, changes to kernel security level, file ownership/permission, permission changes, alternate data streams, changes in configuration or application, and log data (e.g., crashes, threat logs, logins).

For wireless devices, the integrity monitor 16 may monitor signal strength, default gateway address, or other factors that may be used to indicate an attack in a wireless environment. In one example, the host 10 may be a mobile device associated with an access point and subject to a wireless attack when it is connected to a different network that is less secure than the trusted network 12 or subject to a more hostile environment. The attack may involve overpowering the legitimate access point, which causes signal spikes, access point gateway changes, or other events that may not be easily noticed. If the host 10 then connects to the trusted network 12 through the security device 14, information relating to this previous attack will be provided in the posture report.

With some policies, just the fact that there is evidence the system was subject to a known attack might be enough of a reason to deny access. Alternatively, a report that an attack happened, may trigger a set of dynamic checks for traces or signatures of known exploits (e.g., running executable, network port, file, etc.) that would otherwise not be required for that session.

The integrity monitor 16 may also monitor events associated with one or more policies. For example, if a policy specifies that the endpoint 10 cannot view specific websites, the monitor 16 may identify if the device attempted to access these websites or perform other processes that are not permitted by network policy.

It is to be understood that the elements monitored and data collected by the integrity monitor 16 described herein are only examples and that the integrity monitor may be configured to monitor any elements within the host environment (e.g., modules, applications, data structures, processes, signals, data, devices) or collect other data that may be used to indicate possible security threats or noncompliance with network policies.

After the information is gathered about the host 10, the information is summarized in a report, which is sent to the security device 14 for analysis. The decision regarding compliance of the host is based on information gathered by the agent 15 installed on the host 10. As previously described, the determination of policy compliance is not limited to the current state just prior to authentication, but also information gathered over time (e.g., since the agent 15 was first installed or since the host 10 was last connected to the network 12). This involves the added dimension of time and allows the security device 14 to consider detected changes when determining policy compliance, and not just the current state of the host 10. The information transmitted by the agent 15 to the security device 14 may provide details relating to an event or may provide a weight associated with the severity of an attempted or successful attack, for example.

In one embodiment, different posture reports are transmitted based on the context of the host environment. The context may be based on the originating network, host attributes (e.g., network adapter used), etc. The report details may be based on an administrator defined context so that, the performed posture assessment or integrity monitoring reflects the threats prioritized for a particular set of hosts 10. This allows posture assessment or integrity monitoring details to be based on administrator defined context to improve client efficiency and allow for posture assessment or integrity monitoring to reflect the threats prioritized for a specific group or type of hosts.

In one embodiment, the report may be optimized so that only changes since the last report are sent to the security device 14 in order to reduce network: traffic, server processing load, and server archiving. The data set for the first report sent to the security device 14 is cached at the host 10. For every subsequent report, the data is correlated with the cached data set and only the items that differ in value are included in the report.

In one embodiment, the security device 14 maintains a sequence of data associated with successful logins and uses this data to determine changes to the host 10 over time as part of the policy compliance decision.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   initiating integrity monitoring of a network device by an agent at the network device;
   continuously monitoring the network device by the agent to detect changes at the network device over a period of time that may indicate possible security threats or policy noncompliance;
   requesting access to a trusted network by the network device; and
   transmitting from the agent, a posture assessment report comprising information collected during said integrity monitoring including said changes detected at the network device over said period of time, to a security device located within a data path between the network device and the trusted network, for use in determining if the network device is allowed access to the trusted network;
   wherein monitoring comprises monitoring the network device before the network device requests access to the trusted network.

2. The method of claim 1 wherein monitoring further comprises monitoring the network device while the network device is in communication with the trusted network to determine if the network device is compliant with network policies.

3. The method of claim 1 wherein said changes indicate an attack at the network device.

4. The method of claim 3 wherein said changes indicating an attack comprises a change in a wireless signal.

5. The method of claim 3 wherein said changes indicating an attack comprises a change in a gateway address.

6. The method of claim 3 wherein said changes indicating an attack comprises a temporary change to settings at the network device.

7. The method of claim 1 wherein transmitting said information to the security device comprises transmitting a posture assessment report to a security appliance.

8. The method of claim 1 wherein initiating integrity monitoring at the network device comprises storing a list of elements to monitor at the network device.

9. The method of claim 1 wherein said information collected during said integrity monitoring comprises security threat events.

10. The method of claim 1 wherein said information collected during said integrity monitoring comprises actions associated with policy compliance.

11. An apparatus comprising:
    a processor for initiating integrity monitoring of a network device by an agent at the network device, continuously monitoring the network device by the agent to detect changes at the network device over a period of time that may indicate possible security threats or policy noncompliance, requesting access to a trusted network by the network device, and transmitting from the agent, a posture assessment report comprising information collected during said integrity monitoring including said changes detected at the network device over said period of time, to a security device located within a data path between the apparatus and the trusted network, for use in determining if the network device is allowed access to the trusted network; and
    memory for storing said information collected during said integrity monitoring;
    wherein monitoring comprises monitoring the network device before the network device requests access to the trusted network.

12. The apparatus of claim 11 wherein monitoring further comprises monitoring the network device while the network device is in communication with the trusted network to determine if the network device is compliant with network policies.

13. The apparatus of claim 11 wherein said changes indicate an attack at the network device.

14. The apparatus of claim 11 wherein transmitting said information to the security device comprises transmitting a posture assessment report to a security appliance.

15. The apparatus of claim 11 wherein initiating integrity monitoring at the network device comprises storing a list of elements to monitor at the network device.

16. The apparatus of claim 11 wherein said information collected during said integrity monitoring comprises security threat events.

17. The apparatus of claim 11 wherein said information collected during said integrity monitoring comprises actions associated with policy compliance.

18. Logic encoded on one or more non-transitory computer readable media for execution and when executed operable to:
- initiate integrity monitoring of a network device by an agent at the network device;
- continuously monitor the network device by the agent to detect changes at the network device over a period of time that may indicate possible security threats or policy noncompliance;
- request access to a trusted network by the network device; and
- transmit by the agent, a posture assessment report comprising information collected during said integrity monitoring including said changes detected at the network device over said period of time, to a security device located within a data path between the network device and the trusted network, for use in determining if the network device is allowed access to the trusted network;
- wherein monitoring comprises monitoring the network device before the network device requests access to the trusted network.

* * * * *